United States Patent
Cha

(10) Patent No.: US 12,149,629 B2
(45) Date of Patent: Nov. 19, 2024

(54) METHOD AND SYSTEM FOR MANAGING SOFTWARE MULTI-OWNERSHIP ACCOUNT

(71) Applicant: Kyung Woon Cha, Incheon (KR)

(72) Inventor: Kyung Woon Cha, Incheon (KR)

(*) Notice: Subject to any disclaimer, the term of this patent is extended or adjusted under 35 U.S.C. 154(b) by 331 days.

(21) Appl. No.: 17/556,105

(22) Filed: Dec. 20, 2021

(65) Prior Publication Data
US 2023/0133350 A1    May 4, 2023

(30) Foreign Application Priority Data

Oct. 28, 2021 (KR) .................. 10-2021-0145186

(51) Int. Cl.
*H04L 9/32* (2006.01)
*H04L 9/00* (2022.01)

(52) U.S. Cl.
CPC .......... *H04L 9/3239* (2013.01); *H04L 9/3213* (2013.01); *H04L 9/50* (2022.05)

(58) Field of Classification Search
CPC ....... H04L 9/3239; H04L 9/3213; H04L 9/50; H04L 9/3297; G06F 21/10; G06F 21/101; G06F 21/108; G06F 21/1082; G06F 21/1083; G06F 21/1084; G06F 21/1086; G06F 21/109

See application file for complete search history.

(56) References Cited

U.S. PATENT DOCUMENTS

| | | | |
|---|---|---|---|
| 9,189,823 B1* | 11/2015 | Buchheit ............ | G06Q 20/1235 |
| 2010/0281522 A1* | 11/2010 | Hatakeyama ....... | H04L 63/0823 |
| | | | 726/4 |
| 2018/0167198 A1* | 6/2018 | Muller .................... | G06F 21/44 |
| 2018/0316511 A1* | 11/2018 | Meyer ................... | H04W 12/42 |
| 2018/0374173 A1* | 12/2018 | Chen ..................... | G06Q 50/184 |
| 2021/0351940 A1* | 11/2021 | Aschauer .............. | H04L 9/3268 |

FOREIGN PATENT DOCUMENTS

KR    20200129939 A    11/2020

* cited by examiner

*Primary Examiner* — Alexander Lagor
*Assistant Examiner* — Rupali Dhakad
(74) *Attorney, Agent, or Firm* — NKL Law; Byungwoong Park

(57) ABSTRACT

Managing a software multi-ownership account including operations of registering software, setting a usage authority, and transferring a usage authority. The operation of registering the software includes the operations of: receiving, by a reception unit of a management server, a software registration request from a software manufacturer server; checking whether an authentication unit of the management server is a pre-approved manufacturer; and generating a smart contract transaction using time information at which the authentication unit of the management server is requested to register the software and string information of a software name. An authority can be effectively transferred to use software between users to another person by using a sub-access token interworked to a system user account, and by additionally issuing a sub-access token for multiple access authorities for one piece of software, a user is able to have multiple access authorities, thereby broadening the scope of software utilization.

2 Claims, 4 Drawing Sheets

METHOD AND SYSTEM FOR MANAGING SOFTWARE MULTI-OWNERSHIP ACCOUNT

TECHNICAL FIELD

The present disclosure relates to a method for managing a software multi-ownership account, and particularly, to a general-purpose method for managing a software multi-ownership account in which an authority to use software between users is able to be transferred to another person by using a sub-access token of an ownership certification interworked to a user account of a system and which enables sharing of multiple access authorities with one piece of software by additionally issuing a sub-access token.

BACKGROUND

In the case of standalone software executed on a conventional personal computer platform, it is common to install the software by physical means such as a diskette, CD, or DVD, and to authenticate a usage authority through the provided serial number. However, this installation method by physical means could be prone to illegal copies. From then on, with the spread of network infrastructure and the development of computing technology, software was sold and distributed through an online cloud platform, which addressed an issue associated with illegal copying and created a high-quality software market.

However, this method causes an issue of ownership of digital content of a customer. As for the distribution and dissemination of software through a cloud platform, the usage authority is attributed to a platform account of a user, so resale between users is impossible, and there are cases where the platform account of the user is sold to resell the software. In this case, the personal information leakage of the original owner is caused by selling the platform account, and there is an issue in that the original owner re-accesses the platform account sold through personal information and changes access authorities.

In addition, there is also an issue in that a platform such as a platform provider (for example, Google) has a monopoly on the management of software accounts in use by users, so that a user cannot freely use and utilize the software the user has purchased. For example, even when a user requires multiple authorities to use one piece of software depending on the environment, with the current system, a platform account has only a single access authority for one piece of software or service. Accordingly, the need for a new type of an account management method has emerged so that users are able to re-establish their ownership of digital goods by making the user's authority to use the purchased software free from an exclusive management of the platform and allowing the user to freely transfer the purchased software or add a user account with departing from the attribution of the platform for the software purchased by the user through a software cloud platform.

As a related art, there is Korean Patent Application Publication No. 10-2020-0129939 (Method for Managing Accounts in Blockchain Network, and System and Non-Transitory Computer-Readable Recording Medium Thereof), but this merely discloses the technology in which when a user requests to reset a private key in a blockchain network, a new account is issued to change an existing account to a new account, and at least some of data associated with the existing account may become data associated with the new account.

SUMMARY

An aspect of the present disclosure is directed to providing a method for managing a multi-ownership account which enables to freely transfer and receive ownership and authority to use for software attributed to a user account of a cloud platform and to broaden the scope of use and utilization of consumer software by allowing multiple users to share one piece of software.

A method for managing a software multi-ownership account of the present disclosure is divided into an operation of registering software, an operation of setting ownership, and an operation of transferring ownership. The operation of registering the software includes the operations of: receiving, by a reception unit of a management server, a software registration request from a software manufacturer server: checking whether an authentication unit of the management server is a pre-approved manufacturer; and generating a smart contract transaction using time information at which the authentication unit of the management server is requested to register the software and string information of a software name.

The operation of setting the usage authority includes the operations of: downloading, by a user terminal, software interworked to a dedicated application: requesting, by an interworked software server, the management server for a usage authority when the user terminal executes the downloaded software for the first time: extracting, by an authentication unit of the management server, a transaction ID from a database: extracting and generating, by the authentication unit of the management server, a top level account of a user; and using, by the authentication unit of the management server, the transaction ID and a blockchain CA to generate ownership information of the user. By repeatedly generating the access token and the verification token by a usage authority generation unit of the management server, multiple users may share the software through a plurality of access tokens and verification tokens for one piece of software.

The operation of transferring the usage authority includes the operations of: selecting, by a user terminal, software that is desired to be transferred and delivering the same to a management server: matching, by a usage authority transfer unit of the management server, the software with user information that is desired to be received and delivering the same to the user terminal: executing, by the user terminal, an account that is desired to be transferred and delivering the same to the management server: searching, by the usage authority transfer unit of the management server, a transaction ID of the usage authority and requesting a blockchain system for state information: checking, by a reception unit of the management server, block information of the corresponding transaction ID of the blockchain system and receiving the state information: updating, by the usage authority transfer unit of the management server, an authority to use software from a transferor to a transferee in a database; and cancelling, by the usage authority transfer unit of the management server, a previously accessed user connection.

Advantageous Effects

According to the present disclosure, it is possible to freely transfer an authority to use software between users to another person by using a sub-access token of ownership certification interworked to a user account of a system.

In addition, by additionally issuing a sub-access token for multiple access authorities for one piece of software, a user is able to have multiple access authorities, thereby broadening the scope of software utilization. In other words, the issued sub-access token can be transferred and received.

In addition, by preventing the attribution of a company of usage authorities according to the recent cloud platform, it is possible for users to use more fair digital content and establish ownership.

In addition, it improves the security of personal information by preventing users from selling their platform accounts to transfer software.

DETAILED DESCRIPTION

Figure 1:
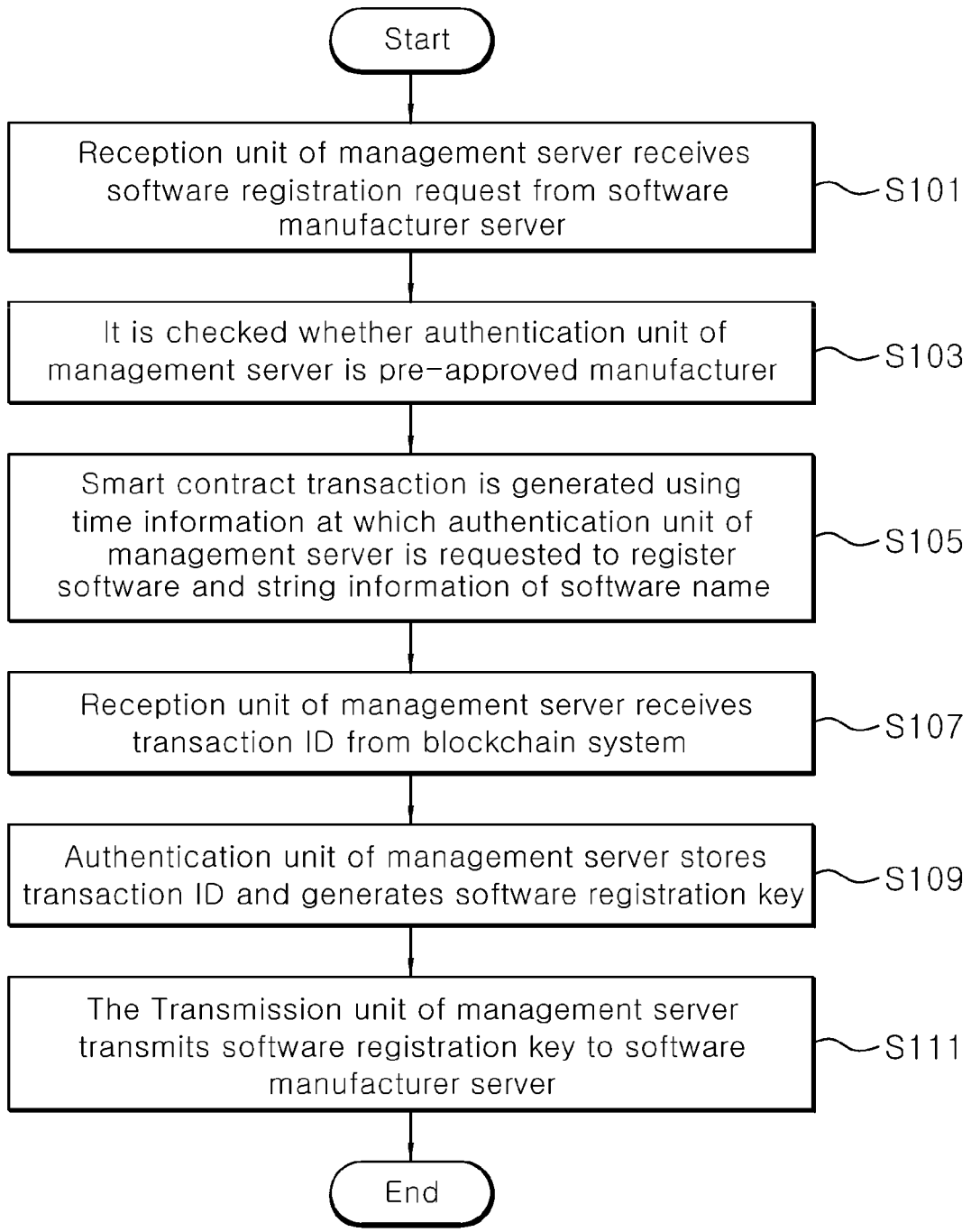
FIG. 1 is a flowchart illustrating a method of registering software for managing a software multi-ownership account according to an embodiment of the present disclosure.

As specific structural or functional descriptions for the embodiments according to the concept of the present disclosure disclosed herein are merely exemplified for purposes of describing the embodiments according to the concept of the present disclosure, the embodiments according to the concept of the present disclosure may be embodied in various forms and are not limited to the embodiments described herein.

While the embodiments of the present disclosure are susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure.

The terms used herein are presented for the description of the specific embodiments but are not intended to limit the present disclosure. The terms of a singular form may include plural forms unless otherwise specified. It will be understood that the terms "comprising" or "having," when used herein, specify the presence of stated features, integers, steps, operations, elements, components, or combinations thereof, but do not preclude the presence or addition of one or more other features, integers, steps, operations, elements, components, and/or combinations thereof.

Hereinafter, embodiments of the present disclosure will be described in detail with reference to the accompanying drawings.

FIG. 1 is a flowchart illustrating a method of registering software for managing a software multi-ownership account according to an embodiment of the present disclosure.

Referring to FIG. 1, a method for managing a software multi-ownership account is divided into an operation of registering software, an operation of setting a usage authority, and an operation of transferring a usage authority.

In the operation of registering the software, a reception unit of a management server receives a software registration request from a software manufacturer server (S101).

It is checked whether an authentication unit of the management server is a pre-approved manufacturer (S103). It is checked whether the authentication unit matches a pre-approved developer key from a database. A smart contract transaction is generated using time information at which the authentication unit of the management server is requested to register the software and string information of a software name (S105). In other words, in order to issue an app_key by verifying and then approving the software requested from a software manufacturer server, the authentication unit may synthesize the numeric data of time information (timestamp) at the time of request and the software name string information to cause a smart contract transaction of the blockchain.

The reception unit of the management server receives a transaction ID from a blockchain system (S107). The smart contract generates an ownership block by mapping a CA address of a user on the blockchain system with respect to the corresponding game information, stores the same in a world state in the blockchain, and returns a transaction ID of the corresponding block. The authentication unit of the management server stores a transaction ID and generates a software registration key (S109). When a HASH code of the transaction ID is generated, the authentication unit may insert the same into a database and designate a numeric value (for example, data type BIGINT) of the index that rises together as an app_key, transform the same back into a LONG type, and return the same to the app_key to be used and approved by the requested software developer. The transmission unit of the management server transmits a software registration key to the software manufacturer server (S111).

Figure 2:
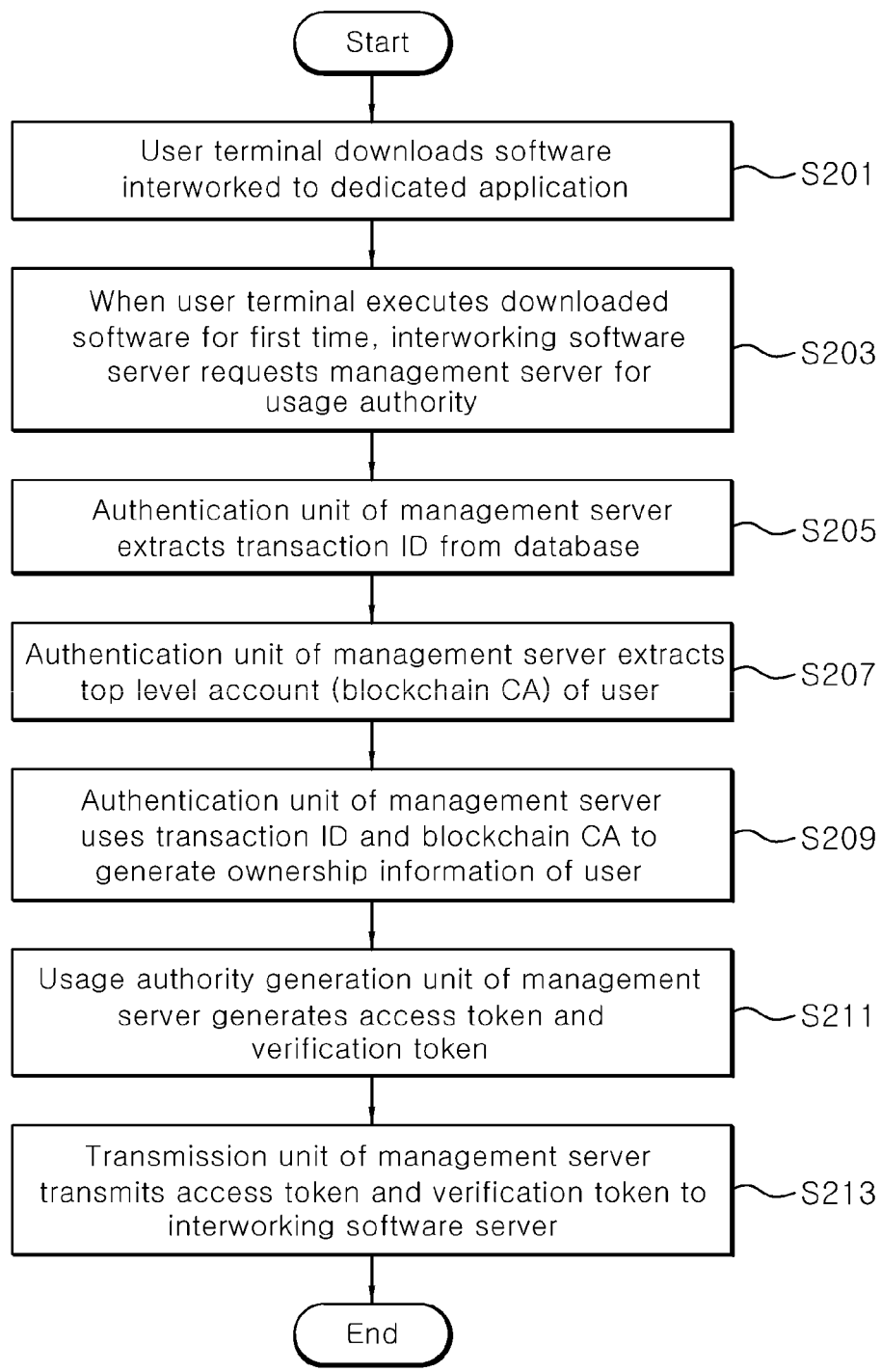
FIG. 2 is a flowchart illustrating a method of setting a usage authority according to an embodiment of the present disclosure.

FIG. 2 is a flowchart illustrating a method of setting a usage authority according to an embodiment of the present disclosure. Referring to FIG. 2, in the operation of setting the usage authority, a user terminal downloads software interworked to a dedicated application (S201). When the connected software is downloaded, it is displayed on the dedicated application, which a user may click to execute.

When the user terminal executes the downloaded software for the first time, an interworking software server requests a management server for a usage authority (S203). In other words, when a user executes the software for the first time, since the interworking software has no access token of the user, an authority to use the software for the user may be requested to be issued from the authentication unit through the app_key and account_token of the interworking software.

The authentication unit of the management server extracts a transaction ID from a database (S205). The authentication unit may extract a transaction ID in the app_info of the database according to the requested app_key.

The authentication unit of the management server extracts and generates a top level account of a user (S207). The authentication unit extracts a top level account of a user through an account_token of the referenced user when requested. The top level account is the CA (account information) of the blockchain.

The authentication unit of the management server uses a transaction ID and a blockchain CA to generate ownership information of a user (S209). In other words, the authentication unit generates ownership information for generating a block. The blockchain system receives ownership information from the authentication unit, generates a new block, and returns the corresponding transaction ID. It is possible to certify ownership of the corresponding software through the transaction ID. In other words, the generated block may serve as a ledger. In other words, by repeating the above operations, an additional sub-access token, that is, ownership, may be issued based on the app_key that authenticates one piece of software.

The usage authority generation unit of the management server generates an access token and a verification token (S211). The usage authority generation unit of the management server generates the access token by encrypting an access token because ownership information, that is, an access token should not be disclosed in public. The user terminal and the server of the company that provides software are made to access through this access token, and it is checked whether this access is valid through the verification token. The validation token is updated over time, and unless a user is a malicious user or hacker, it is possible to always communicate the validation token which is synchronized whenever updated.

The usage authority generation unit maps a user top level account together with a transaction ID, stores the same in an account_info of a database, and generates an access token and a verification token. The access token is a token for ownership, and the verification token is a token for verification or update.

The transmission unit of the management server transmits an access token and a verification token to the interworking software server (S213). In other words, the interworking software server registers the access token as a user access authority account and uses the verification token to verify the account.

The usage authority generation unit refers to a hex value of an account address on a blockchain system of a user, refers to a transaction ID value of the registered software, and stores them in one structure. Among the structure data imported through the smart contract in the name of contents_make_own.sol, the software transaction ID is designated as KEY data, and the account address hex value of a user is designated out of the structure data as a value. Thereafter, the usage authority generation unit accesses a blockchain peer (node) and verifies the corresponding contract on consensus of a blockchain. When there is no forgery issue, the usage authority generation unit generates a block and records the ledger on the blockchain. The transaction ID of the blockchain block generated in this process is returned and transmitted to the authentication unit.

The authentication unit executes the function insert_account_data( ) to combine the transaction ID and the authentication key required for content ownership production to byte stream (serialize), then converts the same into a hex code, and finally an access token that authorizes the use and access authority of the corresponding software may be produced. The access token is returned as a hex code with enhanced security once again as an encryption key through AES128. Thereafter, the top level account information of the user in the authentication unit is bundled and stored in the database, and an access_token is created that may check the ownership or access authorities of the user who requested the first usage authority (ownership). After producing a verification token to check whether the access is valid when in access, the database is requested and inserted into and stored in the account (account_info) table.

The usage authority generation unit may have an N number of ownerships or access authorities to the same software by repeating the above processes. In other words, by repeatedly generating an access token and a verification token by the usage authority generation unit of the management server, multiple users may share the software through a plurality of access tokens and verification tokens for one piece of software.

Figure 3:
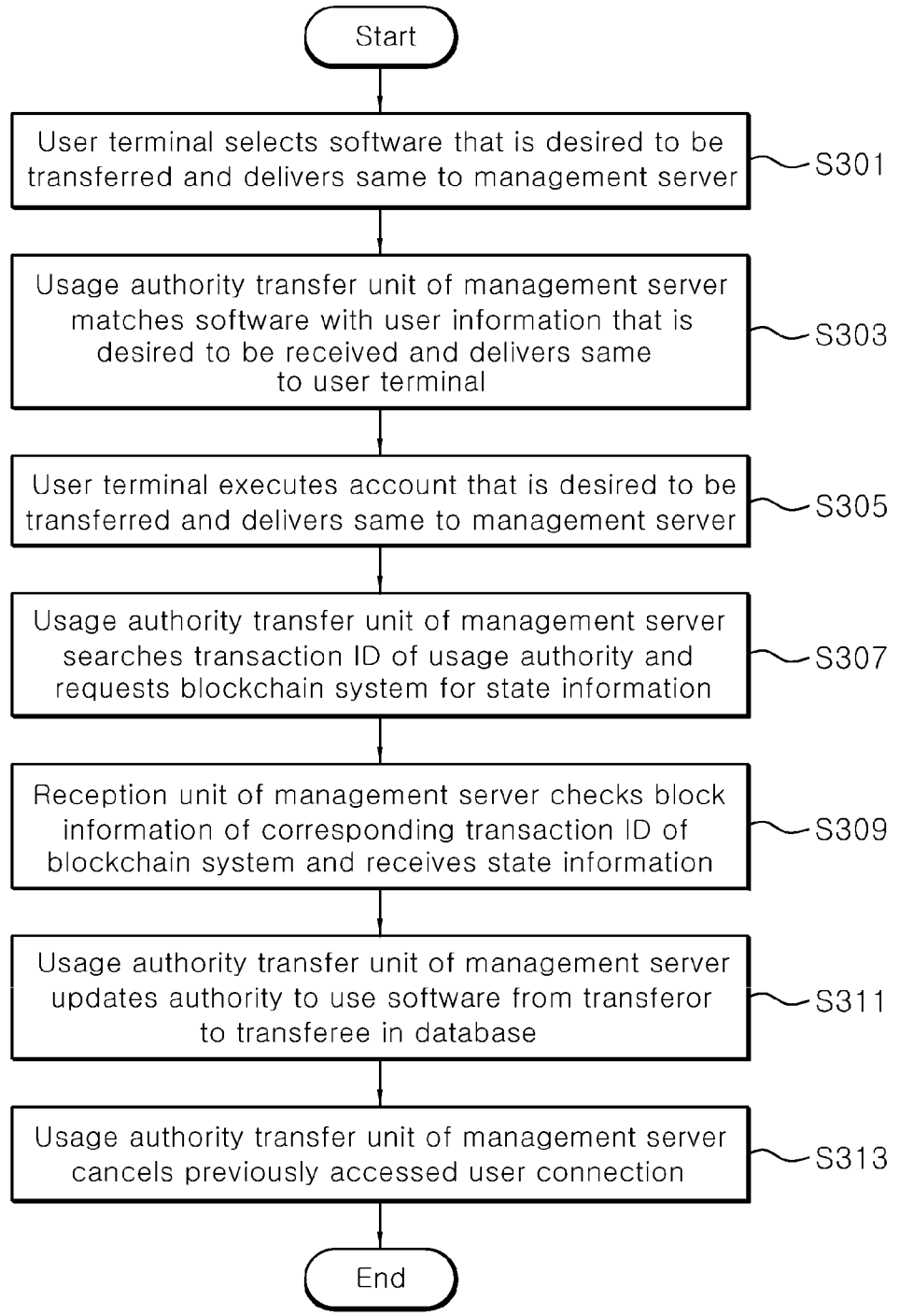
FIG. 3 is a flowchart illustrating a method of transferring a usage authority according to an embodiment of the present disclosure.

FIG. 3 is a flowchart illustrating a method of transferring a usage authority according to an embodiment of the present disclosure. Referring to FIG. 3, in the operation of transferring the usage authority, first, a user terminal selects software that is desired to be transferred and delivers the same to a management server (S301).

A usage authority transfer unit of the management server matches the software with user information that is desired to be received and delivers the same to the user terminal (S303).

The user terminal executes an account that is desired to be transferred and delivers the same to the management server (S305).

The usage authority transfer unit of the management server searches a transaction ID of the usage authority and requests a blockchain system for state information (S307). In other words, after identifying that a user has found the transferee, the selected account, which is one of the owned accounts that the user wants to transfer, is transferred through the usage authority transfer unit. The usage authority transfer unit may search the transaction ID of the currently selected usage authority and make a request to the state information blockchain mainnet.

A reception unit of the management server checks block information of the corresponding transaction ID of the blockchain system and receives the state information (S309). When the state information is transferable state information, after transferring the authority to use the software from a transferor to a transferee and storing the block through a smart contract that transfers and converts the blockchain transaction ID of each blockchain account and usage authority (ownership) of the transferor and transferee, the corresponding transaction ID is returned.

The usage authority transfer unit of the management server updates an authority to use software from a transferor to a transferee in a database (S311).

The usage authority transfer unit of the management server cancels a previously accessed user connection (S313). In other words, all accesses are disconnected and a user and a transferee are allowed to log in again in the updated state.

Figure 4:
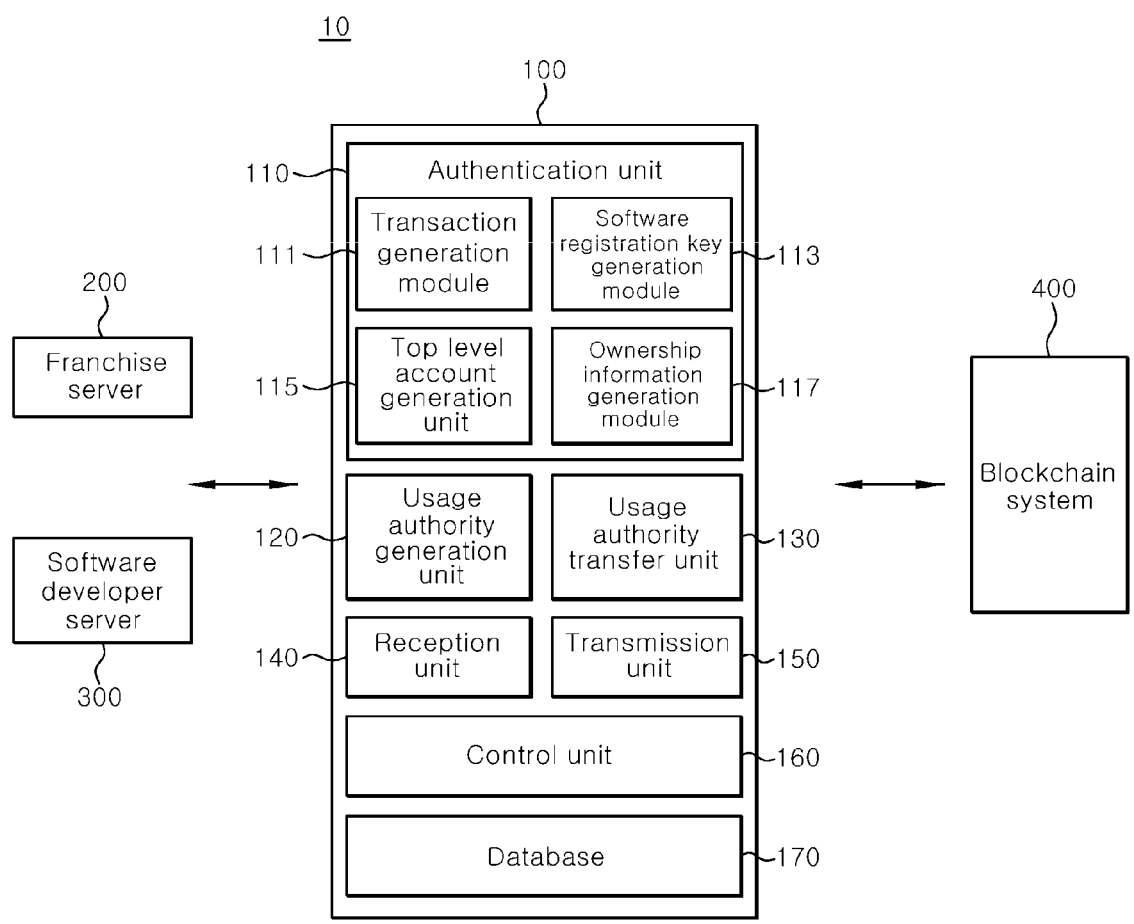
FIG. 4 is a configuration diagram illustrating a system for managing a software multi-ownership account according to an embodiment of the present disclosure.

FIG. 4 is a configuration diagram illustrating a system for managing a software multi-ownership account according to an embodiment of the present disclosure.

Referring to FIG. 4, the system for managing a software multi-ownership account includes a management server 100, a user terminal 200, a software developer server 300, and a blockchain system 400.

The management server 100 includes an authentication unit 110, a usage authority generation unit 120, a usage authority transfer unit 130, a reception unit 140, a transmission unit 150, a control unit 160, and a database 170.

The authentication unit 110 includes a transaction generation module 111, a software registration key generation module 113, a top level account generation module 115, and an ownership information generation module 117.

The transaction generation module 111 may generate a smart contract transaction by using the software registration request time information and the software name string information. When a HASH code of the transaction ID is generated, the software registration key generation module 113 may insert the same into a database and designate a numeric value (for example, data type BIGINT) of the index that rises together as an app_key, transform the same back into a LONG type, and return the same to the app_key to be used and approved by the requested software developer. The top level account generation module 115 extracts a top level account of a user through an account_token of a user. The top level account is the CA (account information) of the blockchain. The ownership information generation module 117 may generate ownership information of a user by using the transaction ID and the CA information of the blockchain.

The usage authority generation unit 120 may generate an access token that certifies the authority to use subordinate software belonging to the top level account generated by the authentication unit.

The usage authority transfer unit 130 may transfer a usage authority so that the access token, which is the software usage authority generated by the usage authority generation unit, may be transferred to or received from another user.

The reception unit 140 may receive a software registration request from a software manufacturer server. The reception unit 140 may receive the transaction ID from the blockchain system.

The transmission unit 150 may transmit a software registration key to the software manufacturer server.

The control unit 160 may be controlled to install a dedicated application in a user terminal. The dedicated application is a launcher application. A user may link a download URL interworked to a specific cloud software sales site where software interworked to the present disclosure is sold or serviced, and may download URL upon request by a user. Assuming that a user is subscribed to the launcher application, when the software is selected and executed, the ownership is stored through the authentication unit of the present disclosure. When the ownership is presently stored, after receiving the access token and verification token for ownership, it accesses the authentication server of the software developer that is desired to be used, completes the authentication process, and starts using the software. The launcher application has a software ownership management tab, and through the ownership management tab, ownership may be added, transferred to others, or managed. The user may be issued an access token of additional ownership. Through this process, a new software account is generated through the software subscription process with a new token. Thereafter, the user authenticates with the authentication server of a software developer with the changed access token by changing the access token with the ownership management tab. The launcher application may change an owner of ownership. The account information of the system of the present disclosure of a new user to be changed is entered and a request is made to the launcher application. The launcher application requests the requested content to the usage authority transfer unit and checks the state information about the ownership stored in the blockchain system, and then, the changed history is stored as a block after consensus within the blockchain on whether it is a valid request. Thereafter, the owner of the software ownership is updated. After the final storage in the database, the software of the existing owner is disconnected by interworking with the authentication unit, and then the ownership information of a new owner is additionally updated and the new user has authority to access the selected software.

The database 170 may store whether a software manufacturer is a pre-approved manufacturer, store the transaction ID generated according to the request of a user terminal, and update the authority to use software of a database from a transferor to a transferee upon request from the usage authority transfer unit. In the database 170, account_info, user_info, and app_info may be stored, and an access token and a verification token may be stored.

While the present disclosure has been described in connection with the exemplary embodiments illustrated in the drawings, they are merely illustrative and the present disclosure is not limited to these embodiments. It will be appreciated by a person having an ordinary skill in the art that various equivalent modifications and variations of the embodiments can be made without departing from the spirit and scope of the present disclosure. Therefore, the true technical scope of the present disclosure should be defined by the technical spirit of the appended claims.

DETAILED DESCRIPTION OF MAIN ELEMENTS

10: management server system
100: management server
110: authentication unit
120: usage authority generation unit
130: usage authority transfer unit
140: reception unit
150): transmission unit
160: control unit
170): database
200): user terminal
300: software developer server
400: blockchain system

What is claimed is:

1. A method for managing a software multi-ownership account, wherein:
   the method is divided into an operation of registering software, an operation of setting a usage authority, and an operation of transferring a usage authority; and
   the operation of registering the software includes the operations of:
   receiving, by a reception unit of a management server, a software registration request from a software manufacturer server;
   checking whether an authentication unit of the management server is a pre-approved manufacturer; and
   generating a smart contract transaction using time information at which the authentication unit of the management server is requested to register the software and string information of a software name,
   wherein the operation of transferring the usage authority includes the operations of:
   selecting, by a user terminal, software that is desired to be transferred and delivering the same to a management server;
   matching, by a usage authority transfer unit of the management server, the software with user information that is desired to be received and delivering the same to the user terminal;
   executing, by the user terminal, an account that is desired to be transferred and delivering the same to the management server;
   searching, by the usage authority transfer unit of the management server, a transaction ID of the usage authority and requesting a blockchain system for state information;
   checking, by a reception unit of the management server, block information of the corresponding transaction ID of the blockchain system and receiving the state information;

updating, by the usage authority transfer unit of the management server, an authority to use software from a transferor to a transferee in a database;

cancelling, by the usage authority transfer unit of the management server, a previously accessed user connection; and disconnecting, by the usage authority transfer unit, all accesses, wherein the software of an existing owner is disconnected by interworking with the authentication unit, wherein the operation of setting the usage authority includes the operations of:

downloading, by a user terminal, software interworked to a dedicated application;

requesting, by an interworked software server, for a usage authority from the manager server when the user terminal executes the downloaded software for the first time;

extracting, by an authentication unit of the management server, a transaction ID from a database;

extracting by the authentication unit of the management server, a top level account of a user;

using, by the authentication unit of the management server, the transaction ID and a blockchain CA to generate ownership information of the user, wherein the top level account of the user is the blockchain CA;

generating, by a usage authority generation unit of the management server, an access token and a verification token, wherein the access token is for ownership and the verification token for verifying the account;

storing, by the usage authority generation unit, a hex value of an account address on the blockchain system of the user and a transaction ID value of a registered software, the hex value is referred and stored, by the usage authority generation unit, in one structure; and transmitting, by a transmission unit of the management server, the access token and the verification token to the interworked software server, wherein the access token is generated by encrypting the ownership information using AES 128 encryption, and wherein the usage authority generation unit of the management server repeatedly generates the access token and the verification token so that multiple users share the software through a plurality of access tokens and verification tokens for one piece of software.

2. The method of claim 1, further including the operations of:

receiving, by a reception unit of the management server, a transaction ID from a blockchain system;

storing, by the authentication unit of the management server, the transaction ID and generating a software registration key; and transmitting, by a transmission unit of the management server, the software registration key to the software manufacturer server.

\* \* \* \* \*